(12) United States Patent
Alasti et al.

(10) Patent No.: US 8,899,050 B2
(45) Date of Patent: Dec. 2, 2014

(54) COMPRESSOR FOR A GAS TURBINE

(75) Inventors: Madjid Alasti, Mülheim an der Ruhr (DE); Hans Maghon, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 1124 days.

(21) Appl. No.: 12/812,061

(22) PCT Filed: Nov. 18, 2008

(86) PCT No.: PCT/EP2008/065761
§ 371 (c)(1),
(2), (4) Date: Jul. 8, 2010

(87) PCT Pub. No.: WO2009/086982
PCT Pub. Date: Jul. 16, 2009

(65) Prior Publication Data
US 2010/0275613 A1 Nov. 4, 2010

(30) Foreign Application Priority Data

Jan. 11, 2008 (EP) .................................... 08000498

(51) Int. Cl.
*F02C 6/08* (2006.01)
*F04D 27/02* (2006.01)
*F01D 25/14* (2006.01)
*F01D 11/24* (2006.01)

(52) U.S. Cl.
CPC ............ *F01D 11/24* (2013.01); *F04D 27/0207* (2013.01); *F01D 25/14* (2013.01); *Y02T 50/675* (2013.01); *F02C 6/08* (2013.01)
USPC .......................................................... 60/785

(58) Field of Classification Search
CPC ....... F01D 25/08; F01D 25/14; F01D 25/145; F02C 6/04; F02C 6/06; F02C 6/08
USPC .......................................................... 60/785
See application file for complete search history.

(56) References Cited

U.S. PATENT DOCUMENTS

| 4,303,371 | A | | 12/1981 | Eckert |
| 4,826,397 | A | * | 5/1989 | Shook et al. ................... 415/116 |
| 5,092,735 | A | * | 3/1992 | Katy et al. ...................... 415/115 |
| 5,160,241 | A | | 11/1992 | Glynn |
| 5,203,162 | A | | 4/1993 | Burge |
| 2003/0223863 | A1 | | 12/2003 | Laurello et al. |
| 2009/0202341 | A1 | * | 8/2009 | Brunet et al. .................. 415/119 |

FOREIGN PATENT DOCUMENTS

| EP | 1167722 A2 | 1/2002 |
| EP | 1614863 A1 | 1/2006 |
| GB | 2054741 A | 2/1981 |

* cited by examiner

*Primary Examiner* — Lindsay Low
*Assistant Examiner* — Jacob Amick

(57) ABSTRACT

An axial compressor providing a thermal adjustment of a housing of a compressor of a stationary gas turbine to the rotor is provided. A partial flow is decoupled from the compressor air flow for cooling gas turbine components. The contact of the partial flow decoupled from the compressor with the interior side of the housing is substantially limited, or even avoided, by a separating element in a collection chamber annularly encompassing the flow path in order to prevent the premature thermal heating of the gas turbine or of the housing during cold starting.

12 Claims, 2 Drawing Sheets

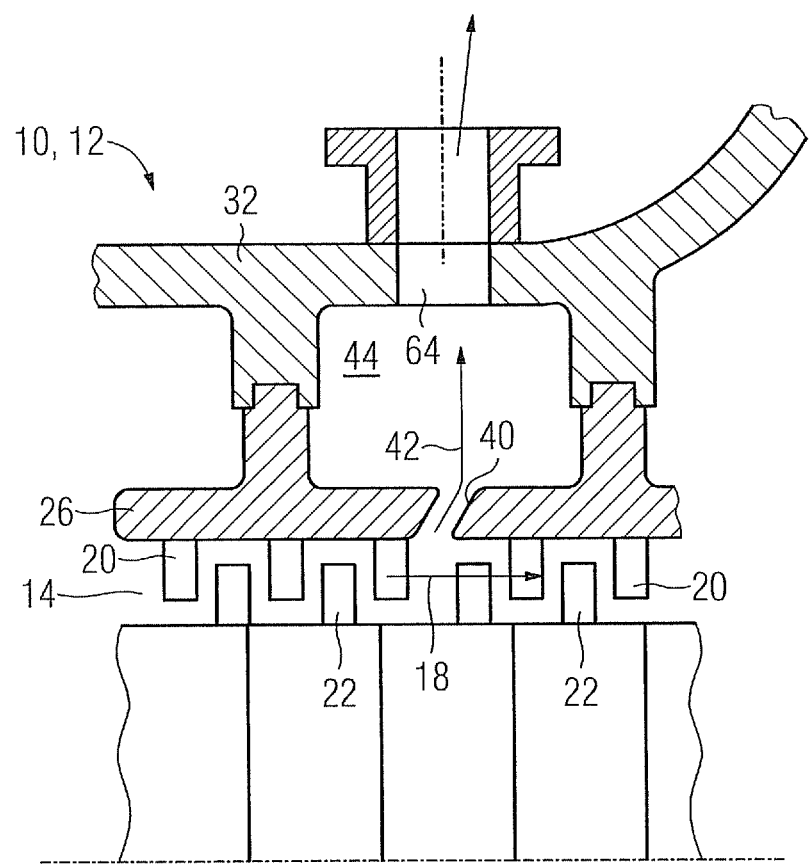

COMPRESSOR FOR A GAS TURBINE

CROSS REFERENCE TO RELATED APPLICATIONS

This application is the US National Stage of International Application No. PCT/EP2008/065761, filed Nov. 18, 2008 and claims the benefit thereof. The International Application claims the benefits of European Patent Office application No. 08000498.9 EP filed Jan. 11, 2008. All of the applications are incorporated by reference herein in their entirety.

FIELD OF INVENTION

The invention refers to an axial compressor for a gas turbine, with a flow path, which is annular in cross section, for a medium which is to be compressed therein, wherein the flow path is delimited radially on the outside by an outer wall which is annular in cross section, and with a compressor casing which encompasses the outer wall, forming at least one collecting chamber which is arranged in between, and with at least one bleed opening in the outer wall for extracting a part of the medium which flows in the flow path into the collecting chamber, and also with at least one opening which is arranged in the casing for discharging the extracted part of the medium from the casing.

BACKGROUND OF INVENTION

It is known that gas turbines have components in the turbine or combustion chamber which are exposed to impingement by hot gas and which are cooled by means of cooling air. Cooling of the components is carried out so that these permanently withstand the hot temperatures of the hot gas. Compressor air, which can be bled from the compressor main flow at different points of the compressor, is used as cooling air, as is known. For this, FIG. 3 shows in a longitudinal section a casing-side cooling air bleed in a compressor 10 of a gas turbine 12. The bleed of compressed air 42 from the air 18 which flows in an annular flow path 14 is carried out via a row of radially disposed bleed openings 40 which are arranged in the outer wall 26 which delimits the flow path 14 on the outside. All the bleed openings 40 lead to an annular chamber 44 which is arranged outside the outer wall 26 and in which the extracted air is collected. The chamber 44 itself is encompassed, and therefore delimited, radially on the outside by the casing 32 of the compressor 10. In the casing 32, again a small number of larger openings 64, for example three or four openings, are distributed over the circumference, from which the part 42 of compressed air which is fed to the annular chamber 44 can be discharged in order to be fed via further pipes, which extend outside the gas turbine and are not additionally shown, to the turbine or to the combustion chamber where the extracted air is used as specified for the purpose of cooling the components which are exposed to impingement by hot gas.

In the annular flow path 14 of the compressor 10, stator blades 20 and rotor blades 22 are arranged in an alternating manner in rings in each case, which stator blades 20 are fastened in a rotationally fixed manner on the casing side, i.e. on the outer wall 26, and which rotor blades 22 are fastened on the inner wall 24 of the annular flow path 14, i.e. on the rotor 24 and rotatable with this. The tips of the rotor blades 22 lie opposite the outer wall of the flow path 14, forming a gap 36, just as the tips of unshrouded stator blades 20 lie opposite the inner wall 24 of the flow path 14. In order to keep these gaps between rotor 24 and stator as small as possible for each operating phase, it is necessary to thermally balance the rotor 24 and the stator as efficiently as possible.

Depending upon the system, the rotors, on account of their large mass and on account of the smaller inner throughflow, are thermally slower than the casing and expand correspondingly slower. In particular, the radial and axial expansions which occur during transient operating conditions, for example during cold starting or during shutdown of the gas turbine, have to be taken into consideration in the design of the necessary radial and axial gaps. This has a disadvantageous effect upon the required installation space, upon the robustness of the arrangement and particularly upon the gas turbine efficiency overall.

Furthermore, an axial compressor for an aircraft gas turbine with an air bleed is known from U.S. Pat. No. 5,203,162. Upstream of the air bleed opening, which is arranged in the casing, there are two radially staggered annular chambers which are separated from each other by means of a common partition. In this case, the inner delimiting wall of the inner annular chamber is formed by the annular wall which forms the flow path of the compressor. Provision is made both in the annular wall and in the partition for openings in this case, through which the partial flow which is extracted from the compressor can flow out. The openings of the annular wall and of the partition are arranged in this case in an axially offset manner in relation to each other in order to trap and to deflect the particles which are entrained by the main flow and which originate for example as a result of abrasion by the compressor rotor blades on the casing, since impingement of the particles upon the comparatively thin outer casing wall is to be avoided.

Furthermore, a compressor with a plurality of bleed openings is known from U.S. Pat. No. 5,160,241, in which the air flow which is extracted from the compressor main flow is routed via an annular chamber. For avoiding varying thermal load along the circumference, provision is made at each bleed opening on the collecting chamber side for deflection plates which extend in a sector-like manner in the circumferential direction. The guide plates in this case are provided only locally in the region of the bleed openings in each case. By means of the deflection plates, the air which flows into the collecting chamber being able to flow along the inner surface of the casing is avoided, as a result of which the unequal thermal load of the casing can be reduced.

Moreover, a guide ring segment of a turbine is known from U.S. Pat. No. 4,303,371, which by means of a U-shaped plate which is arranged therein can be impingement-cooled.

SUMMARY OF INVENTION

The object of the invention is therefore the provision of a compressor for a gas turbine or the provision of a gas turbine with improved efficiency.

The solution of the problem provides that provision is made in the collecting chamber for a separating element which divides the collecting chamber into a radially inner chamber section and a radially outer chamber section.

The invention is based on the knowledge that up to now high heat transfer coefficients occur very quickly in the collecting chambers, i.e. in the bleed chambers, which lead to a rapid heating up and therefore to a rapid thermally induced expansion of the casing wall, whereas heating up of the rotor up to now takes place appreciably slower.

In the case of gas turbines with a thrust bearing on the compressor inlet side for casing and rotor, this led to axial expansions of casing and rotor all bearing at this point. In the case of a cold start, the excessively rapid heating up of the casing in the region of the compressor also led to a displacement of the casing in the region of the turbine unit. Since, however, on account of its thermal inertia the rotor heats up slower than the casing, the axial displacement of the rotor, on account of thermal expansions in the region of the turbine unit, was to a lesser degree than in the case of the turbine casing. In conjunction with a hot gas passage of the turbine unit, which extends along the machine axis and conically widens in the flow direction of the hot gas, this was able to lead to a constriction of the radial gaps at the turbine rotor blades through the casing by an axial displacement of the turbine casing taking place in relation to the turbine-side rotor section in the direction of the turbine exit during the heating up phase of casing and rotor, which after cessation of the thermal heating up and expansion of the rotor, however, was recompensated. In order to largely take into consideration the constriction, comparatively large radial gaps were therefore constructed in the turbine unit, that is to say between turbine rotor blades and the stationary guide rings which lie opposite their tips.

With the invention, it is now proposed that by dividing the collecting chamber into a radially inner chamber section and a radially outer chamber section, the speed at which the casing heats up in the regi convection of bled partial flow along the inner side of the casing being avoided, the heat transfer coefficient there between medium and casing wall can be significantly reduced. The inner side of the casing is no longer washed over in a directly convective manner by the extracted and mostly very warm partial flow. Rather, a chamber which for the most part is closed, preferably completely closed, specifically the radially outer chamber section, is made available between casing inner side and bled air, in which only a free convection can take place. In this respect, the outer chamber section serves as an insulating cavity between the inner chamber section and the casing. Consequently, the separating element is a shielding element for the casing in order to significantly reduce the heat yield of the medium, which flows in the inner chamber section, to the casing in comparison to a collecting chamber without separating element.

In particular, the heat transfer coefficient between medium which flows in the collecting chamber and casing can be reduced so that during cold starting the casing of the compressor heats up slower than is the case without separating element. As a result of this, a matching of the thermal behavior of rotor and stator can be achieved. The matching causes the heating up of rotor and stator to be able to take place at the same time and in equal measure.

By means of the separating element according to the invention, the majority of the part which is extracted from the main flow of the compressor is prevented from flowing along the inner side of the casing. Heating up of the casing and its expansion in the axial direction can therefore be decelerated, which brings about a matching of the thermal behavior or of the thermal expansions of casing and rotor. The time interval between the expansion-induced axial displacement of the casing and the expansion-induced axial displacement of the rotor can be significantly reduced in this way.

By application of the invention, the previously described interim axial relative displacement of turbine on of the compressor in the case of a cold start can be influenced. By a forced casing and turbine-side rotor section, i.e. particularly turbine rotor blades, can be reduced during a cold start since the compressor casing in particular now heats up slowly similar to the rotor and consequently the thermally induced expansions of rotor and stator are temporally adapted to each other. As a result of this, the turbine radial gaps (cold gaps) can be designed smaller, which in steady-state operation reduces the radial gap losses and consequently significantly increases the efficiency of the gas turbine.

In the same way, it is possible as a result to reduce the size of the gaps (cold gaps), which are provided in conformance with construction, between the free ends of the compressor blades and the walls which lie opposite them, which during steady-state operation of the compressor or of the gas turbine has an advantageous effect upon the efficiency.

For the purpose of discharging the extracted part of the medium from the casing or from the collecting chamber, the separating element has a comparatively large discharge opening which is connected via a passage to the opening which is arranged in the casing. As a result of this, it is possible to discharge the part of the medium which flows in the inner chamber section from the collecting chamber or from the casing. The outer chamber section in this case, as seen in the circumferential direction, is interrupted by that passage which connects the opening which is arranged in the casing to the discharge opening which is arranged in the separating element. The interruption can even partially divide the outer chamber section, as seen in the circumferential direction.

Advantageous developments are disclosed in the dependent claims.

The collecting chamber, as seen in the axial direction of the compressor, is expediently delimited by two sidewalls which extend in each case from the casing to the outer wall. Each sidewall in this case can be formed partially or completely by the casing or by an extension of the outer wall, which in this case can merge into each other in the style of a tongue and groove in each case. Overall, therefore, the collecting chamber is delimited radially on the outside by the casing, radially on the inside by the outer wall of the flow path and on both sides by two sidewalls. As a result of this, a collecting chamber is created which is annular in cross section with regard to the machine axis of the compressor.

The collecting chamber can be especially simply divided into a radially inner chamber section and a radially outer chamber section if the separating element is like a plate and the two sidewalls have a slot in each case which lie opposite each other and in which the plate-like separating element is inserted. On account of the usually existing division of the casing into a lower and an upper casing half, the separating element, also formed in halves, for assembly can be inserted into the two slots of each casing half and fixed at a central point. The separating element is preferably seated in the two encompassing slots in a thermally movable manner. As a result of this, stresses in the separating element are avoided. The separating element in this case can be formed from two 180° large sheet metal segments in each case. However, more sheet metal segments could also be used, which then naturally have an arc extent smaller than 180° with regard to the machine axis.

The separating element is preferably arranged closer to the inner side of the casing than to the outer side of the outer wall. In principle, the entire extracted part of the medium which is bled from the flow path flows only in the inner chamber section. Consequently, the cross section of the inner chamber section, as seen transversely to the circumferential direction, should be considerably larger than the cross section of the outer chamber section since the entire mass flow of cooling air which is required for cooling is to be guided through the inner chamber section. As a result of suitable dimensioning, i.e. size of the cross section of the inner chamber section, a comparatively low-loss guiding of the extracted cooling air flow can be achieved.

According to a further preferred development of the invention, the separating element can have uniformly distributed openings with small diameter compared with the discharge openings. In this way, the occurrence of locally excessively high thermal stresses in the housing is prevented as a result of shielding by means of the separating element. As a result of the arrangement of openings, the heat transfer coefficient between bled partial flow and casing can also be variably adjusted in dependence upon the number of openings and upon the distribution of the openings along the circumference. As a result of using openings in the separating element, it is possible for a further part of the extracted air from the inner chamber section to transfer into the outer chamber section so that a mixture of free and forced convection occurs in the outer chamber section. In this respect, it is possible to adjust the heat transfer coefficient in such a way that excessively high thermal stresses in the material of the casing are avoided. Exposure of the outer chamber section to throughflow by the entire extracted air flow, however, is made impossible by the openings with small cross section and is also to be avoided in accordance with specifications.

In order to achieve a bleed which is as uniform as possible of the extracted part of the medium from the flow path into the collecting chamber, the outer wall has a large number of radially arranged bleed openings. As a result of this, it is especially possible to feed uniformly extracted medium to the collecting chamber, as seen along the circumference.

The collecting chamber preferably covers only an axial section of the flow path of the compressor. Consequently, the entire annular flow path does not have a collecting chamber which encloses along its extent it but only an axial section. The axial section is especially preferably provided in the rear compressor stages of an axial compressor. On account of the temperature of the medium which rises during compression of the medium, the invention can be especially advantageously applied in that axial section of the compressor in which the temperature of the medium is especially high. This is the case in the rear compressor stages which are provided on the exit side of the compressor. In this axial section in particular, it is advantageous to they insulate the casing against the extracted medium on account of the higher temperature difference of extracted medium and casing temperature during cold starting.

The compressor can expediently have a plurality of collecting chambers which are axially spaced from each other and which in each case encompass the flow path in an annular manner. The separating element according to the invention in this case can be arranged in one collecting chamber, in a plurality of collecting chambers, or in all the collecting chambers in each case.

Therefore, the use of the invention is not limited only to the rear compressor stages, but the invention can also be used in middle compressor stages or else in front compressor stages, as long as this is expedient.

BRIEF DESCRIPTION OF THE DRAWINGS

Further structural features and advantages are shown in the subsequent figure description. In the drawing:

FIG. 3 shows a detail from the longitudinal section of a compressor of a gas turbine which is known from the prior art.

DETAILED DESCRIPTION OF INVENTION

Figure 1:
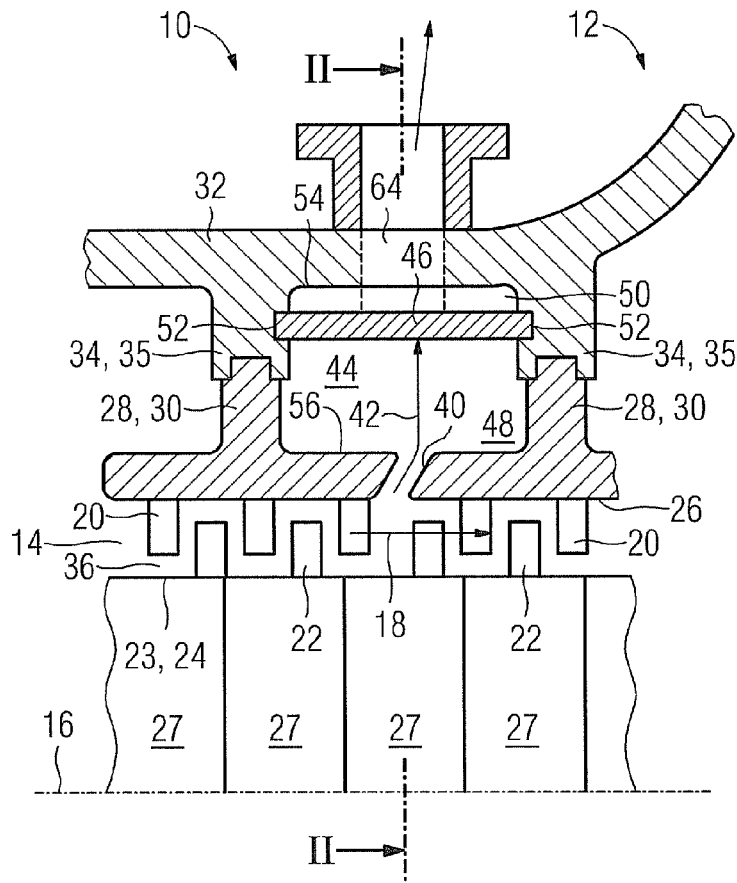
FIG. 1 shows a detail from a longitudinal section through a compressor of a gas turbine according to the invention.
Figure 2:
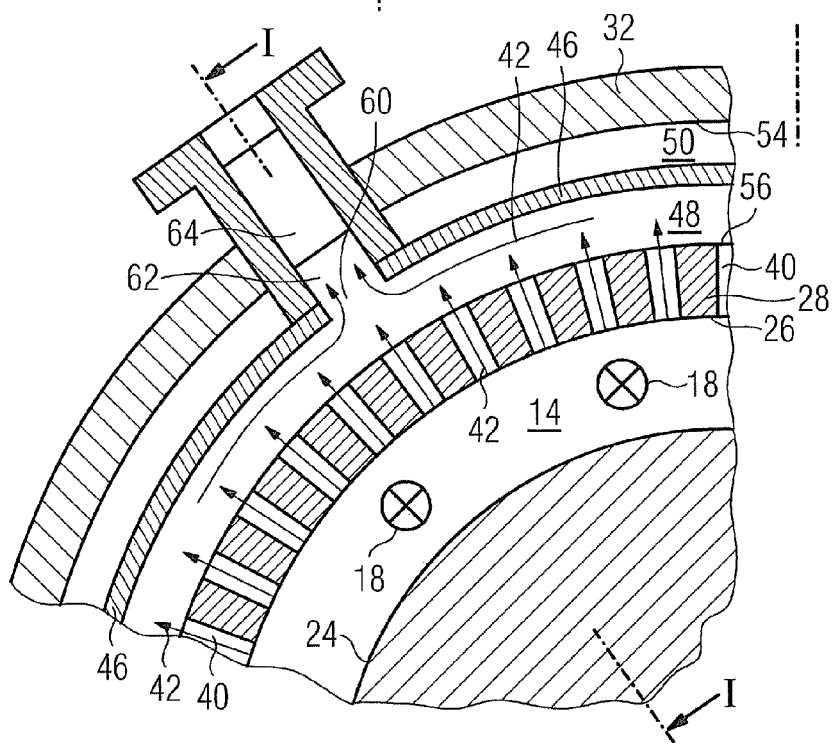
FIG. 2 shows a detail through the cross section of the compressor according to FIG. 1.

FIG. 1 shows in longitudinal section an exit-side section, according to the invention, of the compressor 10 of a gas turbine 12. Analogous to the compressor 10 which is recognized in FIG. 3 in the prior art, this comprises a flow path 14 which extends along a machine axis 16. The flow path 14 is annular, as seen in cross section (cf. FIG. 2). Stator blades 20 and also rotor blades 22, which alternate one after the other along the machine axis 16, are arranged in rings in each case in the flow path 14. The flow path 14 is delimited radially on the inside by the surface 23 of a rotor 24 of the gas turbine 12, which is formed by the generated surfaces of abutting rotor disks 27. Radially on the outside, the flow path 14 is delimited by an outer wall 26 which is annular in cross section. The outer wall 26 is part of a stator blade carrier 28 which encompasses the rotor 24 in an annular manner and in which the compressor stator blades 20 are inserted in a circumferential hook-in means, which is not shown. In addition to its essentially cylindrical extent, the stator blade carrier 28 also comprises two encompassing projections 30. The stator blade carrier 28 is encompassed by an annular casing 32 and in this case is connected via two axially spaced apart, radially inwardly extending projections 34 to the radially outwardly extending projections 30 of the stator blade carrier 28. The projections 30, 34 as pairs form a sidewall 35 in each case. Axially between the two sidewalls 35 and radially between the casing 32 and the outer wall 26, a collecting chamber 44 is therefore arranged, which is annular in cross section and which encompasses the flow path 14 of the compressor 10 concentrically to the machine axis 16. Instead of a two-piece construction consisting of stator blade carrier 28 and casing 32, provision can also be made for a one-piece construction. In this case, the collecting chamber is arranged in the wall of the combined stator blade carrier and casing.

In the outer wall 26 of the stator blade carrier 28, provision is made for a plurality of bleed openings 40 (FIG. 2) which are arranged in a radial manner, of which only one is shown in longitudinal section according to FIG. 1. By means of the bleed opening 40, a part of the medium 18, specifically air, which is to be compressed in the flow path 14, can be extracted according to the arrow 42.

A separating element 46 is arranged in the collecting chamber 44. The separating element 46 divides the collecting chamber 44 into a chamber section 48 which is arranged radially on the inside and also into a chamber section 50 which is arranged radially on the outside. Radially on the outside and radially on the inside in this case is in relation to the machine axis 16 in each case. The two sidewalls 35 are provided in each case with overall annular slots 52 which lie opposite each other. For assembly, the separating element 46 can be inserted into the oppositely disposed slots 52 and be supported therein in a thermally movable manner.

The radial distance between the separating element 46 and the inner side 54 of the casing 32 in this case is significantly smaller than the radial distance between the separating element 46 and the outer side 56 of the outer wall 26, i.e. the outer side 56 of the stator blade carrier 28. The separating element 46, according to FIG. 2, has a comparatively large discharge opening 60 which via a passage 62 is connected to the opening 64 which is arranged in the casing 32. As a result of this, it is possible to discharge the extracted part 42 of the medium 18, which is flowing in the inner chamber section 48, from the casing 32 or from the collecting chamber 44 through the passage 62 in order to guide it from there via pipelines, which are not additionally shown, to the components of the turbine of the gas turbine 12 which have to be permanently cooled during operation of the gas turbine 12 for achieving a particularly long service life.

By attaching a separating element 46 in the collecting chamber 44 of the compressor 10, on the one hand spreading of the entire extracted partial flow 42 along the inner side 54 of the casing 32 and the heat which is entrained by it being fed especially rapidly to the material of the casing 32 in the process, is prevented. On the other hand, the air, which flows radially outwards through the bleed openings 40, directly impinging upon the inner side 54 of the casing 32 and heating this up especially rapidly as a result, is avoided. Overall, the casing 32 heating up quicker than the rotor 24, which is arranged inside the gas turbine 12, during a cold start, is consequently avoided. The thermal behavior of the casing 32 can consequently be matched to the thermal behavior of the rotor 24 so that the two components 24, 32 can heat up approximately synchronously in the region of this axial section. The construction-dependent gaps between the tips of the stator blades 20 and the rotor surface 23 and between the tips of the rotor blades 22 and the outer wall 26, can therefore be designed smaller, which during steady-state operation of the gas turbine 12 reduces the gap losses appreciably. At the same time, as a result of the matched thermal behavior of stator and rotor 24, the radial gap losses in the turbine unit which occur during transient operation are reduced. By reducing the flow losses or gap losses, an increase of efficiency of the gas turbine can be achieved overall.

Depending upon the configuration of the separating element 46 according to the invention, and depending upon the selected distance between inner side 54 of the casing 32 and outer side 56 of the stator blade carrier 28, it may be necessary for the free convection which is available in the outer chamber section 50 to now heat up the casing 32 of the compressor 10 too slowly in comparison to the rotor 24. For this case, it is possible to provide uniformly distributed, smaller openings in the separating element 46 in order to still feed at least a small part of the extracted air 42 to the outer chamber section 50 or to allow it to spread along the inner side 54 of the casing 32, in order to prevent an excessively slow heating up of the casing 32 in relation to the rotor 24.

In principle, the compressor 10 can have not only the one collecting chamber 44 which is shown, but a plurality of collecting chambers, which are axially adjacent to each other, for bleeding cooling air of different pressure and temperature. Depending upon requirement, it may be possible for a separating element 46 to be arranged only in one collecting chamber 44, in a plurality of these collecting chambers, or in all the collecting chambers in each case in order to significantly limit the contact of extracted flow with the inner side 54 of the casing 32 and therefore to decelerate the heat transfer of cooling air to the casing 32.

If possible, the outer chamber section 50 can be tightly separated from the inner chamber section 48 by means of the separating element 46. Since the outer chamber section 50, however, serves only as an insulating chamber or for decelerating the heating up of the casing 32, an absolutely tight separation is not mandatory.

Overall, the invention refers to a measure for thermal adaptation of a casing 32 of a compressor 10 of a stationary gas turbine 12 to its rotor 24, wherein a partial flow 42 is extracted from the compressor air flow 18 for cooling gas turbine components. Contact of the partial flow 42 which is extracted in the compressor with the inner side 54 of the casing 22 is significantly limited, or even avoided, as a result of the clever arrangement of a separating element 46 in a collecting chamber 44 which encompasses the flow path 14 in an annular manner, in order to prevent the premature thermal heating up of the gas turbine 12 or of the casing 32 during cold starting of the compressor 10.

The invention claimed is:

1. A compressor for a gas turbine, comprising:
an outer wall;
a compressor casing;
a collecting chamber;
a bleed opening; and
a separating element,
wherein a flow path exists, which is annular in cross section, for a medium which is to be compressed therein,
wherein the flow path is delimited radially on the outside by the outer wall which is annular in cross section, and with the compressor casing which encompasses the outer wall, forming the collecting chamber which is arranged in between, and
wherein the bleed opening in the outer wall extracts a part of the medium which flows in the flow path into the collecting chamber,
wherein an opening is arranged in the casing in order to discharge the extracted part of the medium from the casing,
wherein the separating element is arranged in the collecting chamber dividing the collecting chamber into a radially inner collecting chamber and a radially outer collecting chamber,
wherein the separating element includes a discharge opening which via a passage is connected to the opening,
wherein the radially outer collecting chamber is formed as a closed chamber which serves as an insulating cavity between the radially inner collecting chamber and the casing,
wherein the collecting chamber, as seen in an axial direction of the compressor, is delimited by two sidewalls,
wherein the two sidewalls extend in each case from the casing to the outer wall, and
wherein the separating element is plate-like and the two sidewalls each include a slot which lie opposite each other and in which the plate-like separating element is inserted.

2. The compressor as claimed in claim 1, wherein the separating element is arranged closer to an inner side of the casing than to an outer side of the outer wall.

3. The compressor as claimed in claim 1, wherein the outer wall includes a plurality of radially arranged bleed openings.

4. The compressor as claimed in claim 1, wherein the collecting chamber covers only an axial section of the flow path of the compressor.

5. The compressor as claimed in claim 4, wherein the axial section is provided in a plurality of rear compressor stages, with regard to the medium.

6. The compressor as claimed in claim 1,
further comprising a plurality of collecting chambers,
wherein an individual separating element may be arranged only in one collecting chamber or a plurality of individual separating elements may be arranged in several of the plurality of collecting chambers, or the plurality of individual separating elements may be arranged in all of the plurality the collecting chambers in each case.

7. A stationary gas turbine which is exposed to axial throughflow, comprising:
a compressor, comprising:
an outer wall;
a compressor casing;
a collecting chamber;
a bleed opening; and
a separating element,
wherein a flow path exists, which is annular in cross section, for a medium which is to be compressed therein, wherein the flow path is delimited radially on the outside by the outer wall which is annular in cross section, and with the compressor casing which encompasses the outer wall, forming the collecting chamber which is arranged in between, and wherein the bleed opening in the outer wall extracts a part of the medium which flows in the flow path into the collecting chamber, wherein an opening is arranged in the casing in order to discharge the extracted part of the medium from the casing, wherein the separating element is arranged in the collecting chamber dividing the collecting chamber into a radially inner collecting chamber and a radially outer collecting chamber, wherein the separating element includes a discharge opening which via a passage is connected to the opening, wherein the radially outer collecting chamber is formed as a closed chamber which serves as an insulating cavity between the radially inner collecting chamber and the casing, wherein the collecting chamber, as seen in an axial direction of the compressor, is delimited by two sidewalls, wherein the two sidewalls extend in each case from the casing to the outer wall, and wherein the separating element is plate-like and the two sidewalls each include a slot which lie opposite each other and in which the plate-like separating element is inserted.

8. The gas turbine as claimed in claim 7, wherein the separating element is arranged closer to an inner side of the casing than to an outer side of the outer wall.

9. The gas turbine as claimed in claim 7, wherein the outer wall includes a plurality of radially arranged bleed openings.

10. The gas turbine as claimed in claim 7, wherein the collecting chamber covers only an axial section of the flow path of the compressor.

11. The gas turbine as claimed in claim 10, wherein the axial section is provided in a plurality of rear compressor stages, with regard to the medium.

12. The gas turbine as claimed in claim 7,
further comprising a plurality of collecting chambers,
wherein an individual separating element may be arranged only in one collecting chamber or a plurality of individual separating elements may be arranged in several of the plurality of collecting chambers, or the plurality of individual separating elements may be arranged in all of the plurality the collecting chambers in each case.

* * * * *